United States Patent
Buffenbarger et al.

(10) Patent No.: US 9,917,544 B2
(45) Date of Patent: Mar. 13, 2018

(54) METHOD AND POWER CONVERTER UNIT FOR OPERATING A GENERATOR

(71) Applicant: GE AVIATION SYSTEMS LLC, Grand Rapids, MI (US)

(72) Inventors: Ryan Lee Buffenbarger, New Carlisle, OH (US); Xiaochuan Jia, Centerville, OH (US); Slobodan Gataric, Xenia, OH (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 25 days.

(21) Appl. No.: 15/043,518

(22) Filed: Feb. 13, 2016

(65) Prior Publication Data

US 2017/0237383 A1    Aug. 17, 2017

(51) Int. Cl.
| H02P 3/14 | (2006.01) |
| H02P 29/20 | (2016.01) |
| H02K 11/33 | (2016.01) |
| H02K 11/21 | (2016.01) |
| H02K 9/00 | (2006.01) |

(52) U.S. Cl.
CPC ............. *H02P 29/20* (2016.02); *H02K 9/005* (2013.01); *H02K 11/21* (2016.01); *H02K 11/33* (2016.01)

(58) Field of Classification Search
CPC .......................................................... H02P 3/14
USPC .......................................................... 318/376
See application file for complete search history.

(56) References Cited

U.S. PATENT DOCUMENTS

| 7,408,319 | B2 | 8/2008 | Lloyd et al. | |
| 8,288,885 | B2 | 10/2012 | Ganev et al. | |
| 8,598,819 | B2 | 12/2013 | Rollman | |
| 2006/0091739 | A1* | 5/2006 | Hilton | H02K 1/04 310/45 |
| 2007/0064460 | A1* | 3/2007 | Siman-Tov | H02M 3/157 363/132 |
| 2007/0222220 | A1* | 9/2007 | Huang | F02N 11/04 290/31 |
| 2009/0315522 | A1* | 12/2009 | Anghel | H02P 9/08 322/29 |
| 2010/0196180 | A1* | 8/2010 | Jung | F04D 27/0292 417/423.4 |
| 2013/0307450 | A1* | 11/2013 | Fuller | B60L 3/0061 318/400.3 |
| 2014/0300298 | A1* | 10/2014 | Liu | H02P 3/22 318/380 |
| 2014/0350765 | A1* | 11/2014 | Yamashita | B60L 9/18 701/22 |

* cited by examiner

Primary Examiner — Bickey Dhakal
(74) Attorney, Agent, or Firm — GE Aviation Patent Operation; William S. Munnerlyn (57) ABSTRACT

A method and power converter unit for operating a generator includes a rotatable shaft operably coupled with a source of rotational force, a rotor mounted to the rotatable shaft and having at least one rotor pole defining a rotatable direct axis, a stator encircling the rotor and having a set of stator windings, and a power output electrically coupled with the set of stator windings and operable in a power generating mode and a power absorption mode

20 Claims, 5 Drawing Sheets

METHOD AND POWER CONVERTER UNIT FOR OPERATING A GENERATOR

BACKGROUND OF THE INVENTION

Electric machines, such as electric motors and/or electric generators, are used in energy conversion. In the aircraft industry, it is common to find an electric motor having a combination of motor and generator modes, where the electric machine, in motor mode, is used to start an aircraft engine, and, depending on the mode, also functions as a generator to supply electrical power to aircraft systems. Regardless of the mode, the machines typically include a rotor having main windings that are driven to rotate by a source of rotation, such as a mechanical or electrical machine, which for some aircraft can be a gas turbine engine.

BRIEF DESCRIPTION OF THE INVENTION

In one aspect, an electric machine assembly includes a rotatable shaft configured to operably couple with a source of rotational force, a rotor mounted to the rotatable shaft and having at least one rotor pole defining a rotatable direct axis, a stator about the rotor and having a set of stator windings, and a power output electrically coupled with the set of stator windings and operable in a power generating mode and a power absorption mode. The power output in the power generating mode is configured to direct power generated in the set of stator windings to be supplied to a power system. The power output in the power absorption mode is configured to convert excess power from a power system to a set of absorption power signals synchronized to the rotatable direct axis, and to supply the set of absorption power signals to the set of stator windings.

In another aspect, a power converter unit for an electric machine includes a first input/output connection configured to operably couple with a set of stator windings of an electric machine, a second input/output connection configured to operably couple with a power distribution network, and a power-converting circuit operable in a power supplying mode or in a power dissipating mode. The power-converting circuit in the power supplying mode is configured to convert a first power received at the first input/output connection from the electric machine to a desired power supply for the power distribution network and to supply the converted first power to the second input/output connection. The power-converting circuit in the power dissipating mode is configured to convert a second power in excess of desired power characteristics received at the second input/output connection from the power distribution network to a converted second power and to supply the converted second power to the first input/output connection. The converted second power corresponds to a rotating rotor magnetic field of the electric machine and will reduce torque experienced by the electric machine when supplied to a set of stator windings in the electric machine.

In yet another aspect, a method of operating an electric machine, includes determining, in a control module, whether a current power level for a power distribution system coupled with an input/output of the electric machine exceeds a power level threshold value, in response to the current power level not exceeding the power level threshold value, operating the electric machine in a power generation mode wherein rotation of a rotor relative to a set of stator windings supplies power from the electric machine to the power distribution system, and in response to the current power level exceeding the power level threshold value, operating the electric machine in a power absorption mode wherein power in the power distribution system is received by a power converter, converted by the power converter to a set of power absorption signals synchronized to a rotating magnetic field of a rotating rotor in the electric machine, and wherein the set of power absorption signals is supplied from the power converter to a set of stator windings of the electric machine, to dissipate heat in the set of stator windings without affecting torque experienced by the rotating rotor.

DESCRIPTION OF EMBODIMENTS OF THE INVENTION

While regenerative energy conversion according to the invention can be implemented in any environment, the disclosed embodiments are contemplated to be implemented in a jet engine environment, where the generator is typically referred to as a machine, an example of which is a generator.

Figure 1:
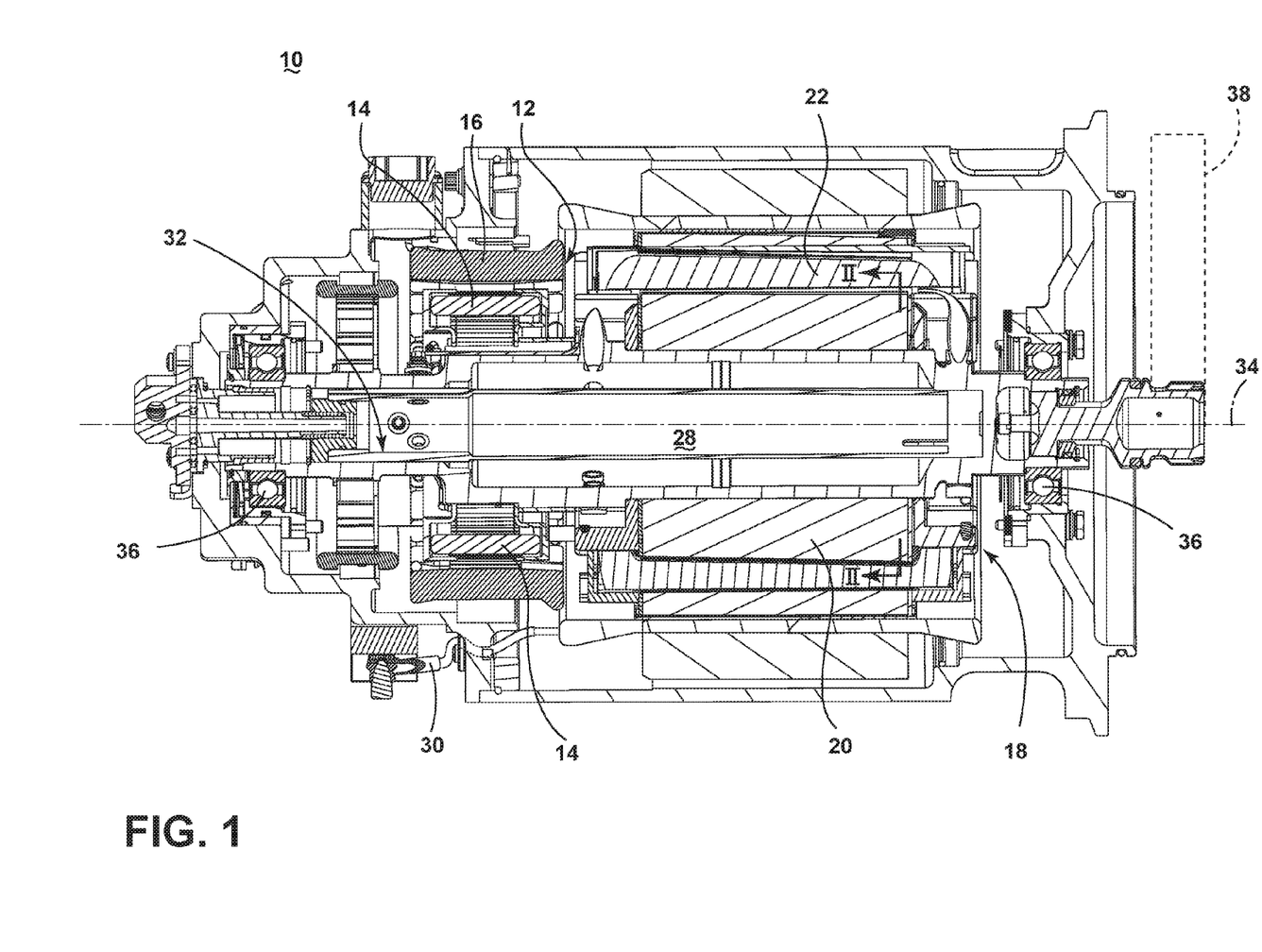
FIG. 1 is a sectional view of a generator assembly, in accordance with various aspects described herein.

FIG. 1 illustrates an electric machine assembly 10 mounted on or within a gas turbine aircraft engine. The gas turbine engine may be a turbofan engine, such as a General Electric GEnx or CF6 series engine, commonly used in modern commercial and military aviation or it could be a variety of other known gas turbine engines such as a turboprop or turboshaft.

The electrical machine assembly 10 comprises a first machine 12 having an exciter rotor 14 and an exciter stator 16, and a synchronous second machine 18 having a main machine rotor 20 and a main machine stator 22 encircling the main machine rotor 20. At least one power connection or power output is provided on the exterior of the electrical machine assembly 10 to provide for the transfer of electrical power to and from the electrical machine assembly 10. Power is transmitted by this power connection, shown as an electrical power cable 30, directly or indirectly, to an electrical load and may provide for a three phase with a ground reference output from the electrical machine assembly 10.

At least a subset of the exciter rotor 14, the exciter stator 16, the main machine rotor 20, or the main machine stator 22 can include a respective set of one or more windings. As used herein, a set of windings can include a length of conductive wire wound about a post or set of posts, or arranged to induce or generate current in a predetermined configuration. In one non-limiting example embodiment, the main machine rotor 20 can include a set of rotor windings arranged to generate at least one pole about the rotor 20. Similarly, the main machine stator 22 can include a set of stator windings arranged about the stator 22 such that rotation of an energized set of main machine rotor windings relative to the set of main machine stator windings induces current in the set of main machine stator windings.

The electrical machine assembly 10 further comprises a rotatable shaft 32 mechanically coupled to a source of axial rotation, which may be a gas turbine engine (not shown), about a common axis 34. The rotatable shaft 32 is supported by spaced bearings 36. The exciter rotor 14 and main machine rotor 20 are mounted to the rotatable shaft 32 for rotation relative to the stators 16, 22, respectively, which are fixed within the electrical machine assembly 10. The stators 16, 22 may be mounted to any suitable part of a housing portion of the electrical machine assembly 10. The electrical machine assembly 10 may also comprise a mechanical shaft 38 (shown as a schematic box) that couples the rotatable shaft 32, for instance, with the gas turbine engine (not shown). The mechanical shaft 38 is configured such that rotation of the gas turbine engine produces a mechanical force that is transferred through the shaft 38 to provide rotation to the rotatable shaft 32.

In the illustrated embodiment, the second machine 18 is located in the rear of the electric machine assembly 10 and the first machine 12 is positioned in the front of the electric machine assembly 10. Other positions of the first machine 12 and the second machine 18 are envisioned.

Figure 2:
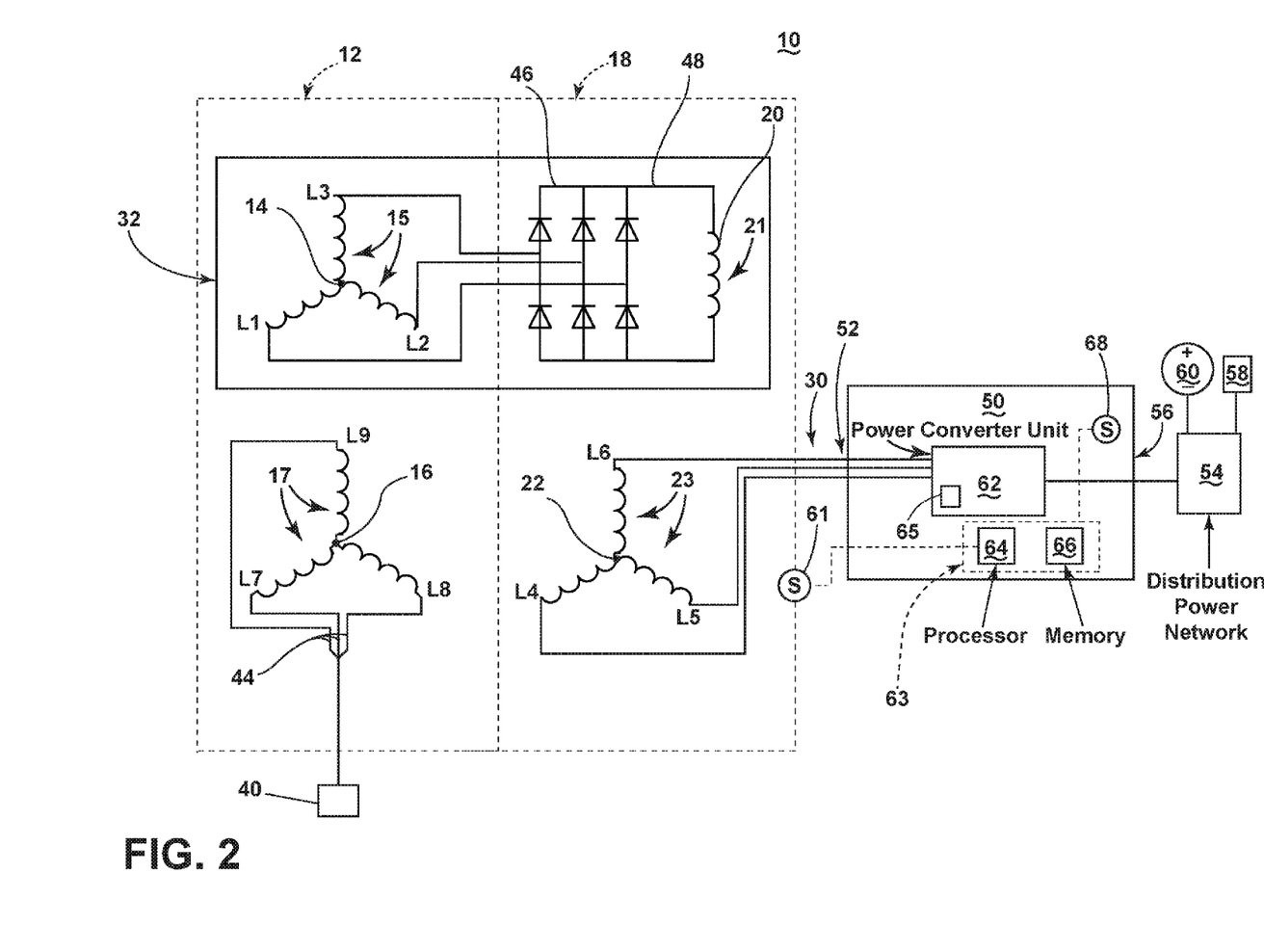
FIG. 2 is a schematic view of a generator assembly rotatable shaft, in accordance with various aspects described herein.

Turning now to FIG. 2, the electric machine assembly 10 further comprises an exciter power source 40 coupled with the exciter stator 16 by output leads 44. As shown, the exciter stator 16 comprises a set of exciter stator windings having three leads L7, L8, L9 for providing three phase excitation. The exciter power source 40 provides three phase AC power output to provide excitation to each of the three exciter stator 16 leads L7, L8, L9. Although the exciter stator 16 is shown having three leads L7, L8, L9, alternative configurations are envisioned wherein the stator 16 may have only a single lead, or any number of multiple leads. Correspondingly, the exciter power source 40 may provide single or multiple phase AC power output to each of the configured leads.

The exciter power source 40 may, for instance, include power from an auxiliary power unit (APU), the power output of another running turbine engine or another electric machine 10, a common three phase wall plug, a ground power cart or even a direct current (DC) source such as batteries, when coupled with an inverter to generate the necessary exciter excitation. In another embodiment of the disclosure, the electric machine assembly 10 can include a permanent magnet generator, wherein the exciter power source is a rotatable permanent magnet positioned adjacent to a concentric set of permanent magnet stator windings, such that rotation of the permanent magnet relative to the permanent magnet stator windings generates energy in place of the exciter power source 40.

The exciter rotor 14 can include a set of exciter rotor windings 15 arranged to provide for three phase output along leads L1, L2, L3 which, as illustrated, are supplied to a rectifier 46, which is illustrated as a diode-based rotating rectifier. The rectifier 46 further supplies a common supply line 48 to the main machine rotor 20 or a set of main machine rotor windings 21.

The main machine stator 22 can include a set of main machine stator windings 23 having leads L4, L5, L6 arranged to couple with a power converter unit 50 at a first input/output connection 52. The power converter unit 50 can further be electrically coupled with a power distribution network 54 or system at a second input/output connection 56. The power distribution network 54 can be configured to regulate and supply power to an electrically coupled set of electrical loads (schematically illustrated as a single electrical load 58). Examples of electrical loads 58 can include, but are not limited to, high voltage electrical loads, such as electronic flight actuators, or low voltage electrical loads, such as various small motors and electrical equipment. The power distribution network 54 can further include or be electrically coupled with additional power-supplying units, including, but not limited to, a set of generators, auxiliary power units, emergency power units, and the like (schematically illustrated as a power source 60). While not illustrated, the power distribution network 54 can include a set of power transmission conductors, such as bus bars, that electrically interconnect the electric machine assembly 10, the additional power sources 60, and the set of electrical loads.

Embodiments of the electric machine assembly 10 can optionally include a rotatable shaft sensor 61 fixedly positioned relative to the rotatable shaft 32, wherein the rotatable shaft sensor 61 indicates the rotational position of the shaft 32. For example, the rotatable shaft sensor 61 can include a mechanical sensor configured to sense or measure a known rotational position of the rotatable shaft 32, the main machine rotor 20, or rotor 20 pole. The rotatable shaft sensor 61 can further be configured to provide a signal indicative of the rotational position of the rotatable shaft 32, main machine rotor 20, or rotor 20 pole.

Embodiments of the disclosure can be included wherein the electric machine assembly is configured to generate alternating current (AC) or direct current (DC). Additionally, while an electric machine assembly 10 is described, embodiments of the disclosure can include any type of synchronous or asynchronous generator, or any type of synchronous, asynchronous, permanent magnet, or induction electric motor.

The power converter unit can include a power converter 62, a control module 63, and a power sensor 68. The control module can further comprise a processor 64, memory 66. The power sensor 68 can be positioned and configured to sense or measure at least one power characteristic, such as a voltage, current, or power level, of power supplied or received by the power distribution network 54, by way of the second input/output connection 56. In this sense, the power sensor 68 can be configured to sense or measure the at least one power characteristic, and provide a signal indicative of the sensed or measured power characteristic. Additionally, while the power sensor 68 is shown integrated with the power converter unit 50, embodiments of the disclosure can be envisioned wherein the power sensor 68 is remote from the power converter unit 50.

Non-limiting examples of the power converter 62 can include a transistor bridge 65, power-converting circuit, a current converter, or a current regulator. The power converter 62 can be electrically positioned between the first input/output connection 52 and the second input/output connection 56, and configured to alter, change, convert, or modify power traversing the power converter unit 50 between the first and second input/output connections 52, 56. In this sense, the power converter 62 can be configured to selectively or controllably convert a first power received by at least one of the first or second input/output connections 52, 56 to a second power supplied to the other of the first or second input/output connection 52, 56. Examples of the power conversion can include converting a first alternating current (AC) power to a second AC power, an AC power to a direct current (DC) power, a first DC power to a second DC power, or a DC power to an AC power. In addition to the aforementioned conversion examples, the power converter 62 can include selectively or controllably converting a first voltage to a second voltage, or converting a first power signal or frequency to a second power signal or frequency.

Thus, one non-limiting example embodiment of the disclosure can be included wherein the power converter 62 or power converter unit 50 can be configured to selectively or controllably convert a first AC power generated by the electric machine assembly 10 and received by the first input/output connection 52 to a second AC or DC power supplied to the power distribution network 54 by the second input/output connection 56. In the aforementioned example configuration, the second AC or DC power can be different from the first AC power. In another non-limiting example embodiment of the disclosure, the power converter 62 or power converter unit 50 can be configured to selectively or controllably convert a first DC power generated by the electric machine assembly 10 and received by the first input/output connection 52 to a second AC or direct current DC power supplied to the power distribution network 54 by the second input/output connection. In this aforementioned example configuration, the second AC or DC power can be different from the first DC power.

In yet another non-limiting example embodiment of the disclosure, the power converter 62 or power converter unit 50 can be additionally configured to selectively or controllably convert power bi-directionally, that is, convert AC or DC power received by the first or second input/output connection 52, 56 to a different AC or DC power to be supplied to the other of the input/output connections 52, 56. In yet another non-limiting example embodiment of the disclosure, the converting of power supplied to the power distribution network 54 by way of the second input/output connection 56 can be selected or operated to match a desired power supply for the power distribution network 54. For instance, if the power distribution network 54 operates at 270 Volts DC, the power converter unit 50 or power converter 62 can be selected or configured to operate to convert power received at the first input/output connection 52 to the desired power supply of 270 Volts DC at the second input/output connector 56.

The control module 63 or the processor 64 can be operably coupled with the power converter 62, the memory 66, the optional rotatable shaft sensor 61, and the power sensor 68. In this sense, the power converter unit 50, the control module 63, or the processor 64 can be configured to receive the signal indicative of the sensed or measured power characteristic from the power sensor 68, and the signal indicative of the rotational position of the rotatable shaft 32 from the optional rotatable shaft sensor 61.

At least one of the processor 64 or the memory 66 can store a set of operational control profiles or programs for operating the electric machine assembly 10, the power converter unit 50, or the power converter 62. In one example embodiment, the memory 66 can store a set of power level threshold values, or power level threshold ranges for the power distribution network 54. The memory 66 can include random access memory (RAM), read-only memory (ROM), flash memory, or one or more different types of portable electronic memory, such as discs, DVDs, CD-ROMs, etc., or any suitable combination of these types of memory. The power converter unit 50 can be operably coupled with the memory 66 such that one of the power converter unit 50 and the memory 66 can include all or a portion of a computer program having an executable instruct ion set for controlling the operation of the aforementioned components, or a method of operating the same. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Machine-executable instructions, associated data structures, and programs represent examples of program code for executing the exchange of information as disclosed herein. Machine-executable instructions can include, for example, instructions and data, which cause a general purpose computer, special purpose computer, power converter unit 50, control module 63, processor 64, or special purpose processing machine to perform a certain function or group of functions. In implementation, the functions can be converted to a computer program comprising a set of executable instructions, which can be executed by the processor 64.

The electric machine assembly 10 controllably operates in two distinct modes: a power generating mode and a power absorption mode. The power converter unit 50 can operate to effect the switching, toggling, or alternating between the two distinct modes based on the sensed or measured power characteristic provided by the power sensor 68. For example, the power converter unit 50, the control module 63, or the processor 64 can repeatedly compare the current power characteristic from the power sensor 68 to the power level threshold value or power threshold value range stored in the memory 66. In response to a comparison that indicates the current power characteristic from the power sensor 68 does not exceed the power level threshold value or power threshold value range, the electric machine assembly 10 can be controllably operated in the power generating mode. Alternatively, in response to a comparison that indicates the current power characteristic from the power sensor 68 exceeds the power level threshold value or power threshold value range, the electric machine assembly 10 can be controllably operated in the power absorption mode. The two distinct modes are described below.

In the power generating mode, the electric machine assembly 10 operates to, or is controlled by the power converter unit 50, the control module 63, or the processor 64 to operate to generate power. In one example embodiment of the power generation mode, the rotatable shaft 32 is driven by a rotational force such as by the gas turbine engine or the mechanical shaft 38. The rotation of the rotatable shaft 32 co-rotates the exciter rotor 14 relative to the energized exciter stator windings 17. The rotation of the exciter rotor 14 relative to the energized exciter stator windings 17 generate a three phase output in the set of exciter rotor windings 15. This three phase output is rectified by the rectifier 46 to a DC output, and supplied by the rectifier common supply line 48 to the main machine rotor 20.

The rotation of the energized main machine rotor windings relative to the main machine stator 22 generates a three phase output in the main machine stator windings 23. The electrical power cable 30 supplies the three phase power to the power converter unit 50. The power converter unit 50 or power converter 62 can be further operated to convert the three phase power received at the first input/output connection 52 to, for example, a desired power supply for the power distribution network 54, as explained above.

In the power absorption mode, the electric machine assembly 10 operates to, or is controlled by the power converter unit 50, the control module 63, or the processor 64 to operate to absorb excess power from the power distribution network 54, and dissipate the excess power in the electric machine assembly 10.

Excess power can be applied to the power distribution network 54 during continuous or transitory periods of power distribution network 54 operation. In one non-limiting example, excess power can "spike" or can be applied to the power distribution network 54 during transitory periods of sudden power demand changes, such as when large power-consuming electrical loads 58 such as electrical actuators are turned off, or after electrically coupling a new active power source 60 to the power distribution network 54. In another non-limiting example, excess power can "spike" or can be applied to the power distribution network 54 during transitory switching on and off of a set of electrical loads 58, such as when operating a set of modular power tiles configured to selectively enable or disable the set of electrical loads 58.

As used herein, "excess power" can include voltage levels, current levels, or power levels greater than a respective voltage, current, or power threshold value, which can be independently or collectively defined by the power level threshold value or power threshold value range, explained herein. For example, if the power distribution network 54 is designed or desired to operate at 270 Volts DC, a power level threshold value can be defined at 271 Volts DC. If the power level of the power distribution network 54 reaches or exceeds 271 Volts DC (e.g. as sensed by the power sensor 68), the power converter unit 50, the control module 63, the processor 64, or the power converter 62 can operate to "absorb" an amount of excess power from the power distribution network 54. Alternatively, the power level threshold value can include a range of acceptable operating values, for instance, between 270 Volts DC and 271 Volts DC. In this example, if the power level of the power distribution network 54 exceeds the power level threshold range (e.g. the power distribution network 54 voltage reaches 272 Volts DC), the power converter unit 50, processor 64, or power converter 62 can operate to "absorb" an amount of excess power from the power distribution network 54. Alternatively, when the power level threshold values are exceeded, the power converter unit 50, the power converter 62, the control module 63, or the processor 64 can determine that an excess power condition exists.

While the aforementioned examples are described in terms of DC voltage values, embodiments of the disclosure can be included wherein current, power, voltage, or a combination thereof can be monitored or sensed (for example, by the power sensor 68) and compared a set of power level threshold values or ranges. Additionally, the DC voltage threshold values or ranges are included merely for understanding, and additional voltage threshold values or ranges can be included. In one non-limiting embodiment, the power absorption mode be initiated or operated when a set or subset of power level threshold values or ranges are exceeded, for example, when voltage threshold value and current threshold value are exceeded.

The power converter unit 50, power converter 62, control module 63, or processor 64 responds to the determination that the power distribution network 54 includes excess power, or that an excess power condition exists, by operating the power converter 62 in reverse, compared with the power generation mode. That is, the power converter unit 50 operates to receive an amount of power or excess power (i.e. power, voltage, or current levels in excess of the power level threshold value or range) at the second input/output connection 56, converts that amount of power or excess power to a set of absorption power signals 67, and provides or supplies the set of absorption power signals 67 to the set of main machine stator windings 23 by way of the first input/output connection 52. Stated another way, the electric machine assembly 10 or the power converter unit 50 reverses the power flow, that is, ceases generating power for the power distribution network 54 and commences receiving power from the power distribution network.

The absorption power signals generate a magnetic field, such as a rotating magnetic field, in the set of main machine stator windings 23. The magnetic field in the stator windings 23 can interact with the magnetic field generated by the set of main machine rotor windings 21. Additionally, at least a portion of the absorption power signals can generate heat losses, copper losses, resistive losses, winding losses, or the like as the absorption power signals current traverses the resistive conductors of the set or stator windings 23. These resistive losses can be actively or passively dissipated by the existing stator windings thermal management configuration of the electric machine assembly 10. In an alternative configuration of the electric machine assembly 10, the stator windings thermal management configuration, that is, the arrangement or cooling enabling components of the electric machine assembly 10 can be permanently or temporarily enhanced during the power absorption mode to account for increased heat generation in the set of stator windings 23, compared with the power generation mode.

The interaction of the magnetic field of the main machine stator windings 23 with the rotating magnetic field of the main machine rotor windings 21 can effect a sudden or quick change in torque experienced by the main machine rotor 20 or the rotatable shaft 32 when the respective magnetic fields are not aligned, that is, are not in-phase or in-sync. The change in torque can further be experienced over an extended period of time, in a repeating pattern, or the like. Since the rotatable shaft 32 is being driven by a mechanical force, such as the gas turbine engine of an aircraft, a change in torque experienced by the rotatable shaft 32 can be undesirable, as the mechanical resistance, impedance, interruption, or the like, on the shaft 32 can result in harm or damage to the mechanical rotating components, or undesirable vibrations to the electric machine assembly 10. Additionally, the resistance, impedance, interruption, vibrations, or the like can be further transferred to additional electrical machine assembly 10 components, gas turbine engine components, or mechanical interlinking components between the assembly 10 and engine (e.g. the mechanical shaft 38, an accessory gearbox, etc.). Furthermore, the quantity or level of excess power can be related to the amount of resistance, impedance, interruption, or the like, wherein a larger amount of excess power relates to a larger or more sudden resistance or interruption.

Thus, embodiments of the disclosure can be included wherein the power converter unit 50, the power converter 62, the control module 63, or the processor 64 can be included wherein the absorption power signals can be generated, by way of controllable or selectable power conversion in the power converter 62, such that the absorption power signals generate a magnetic field in the main machine stator windings 23 in-line with, in-phase with, or in-sync with the rotating magnetic field of the main machine rotor 20.

Figure 3:
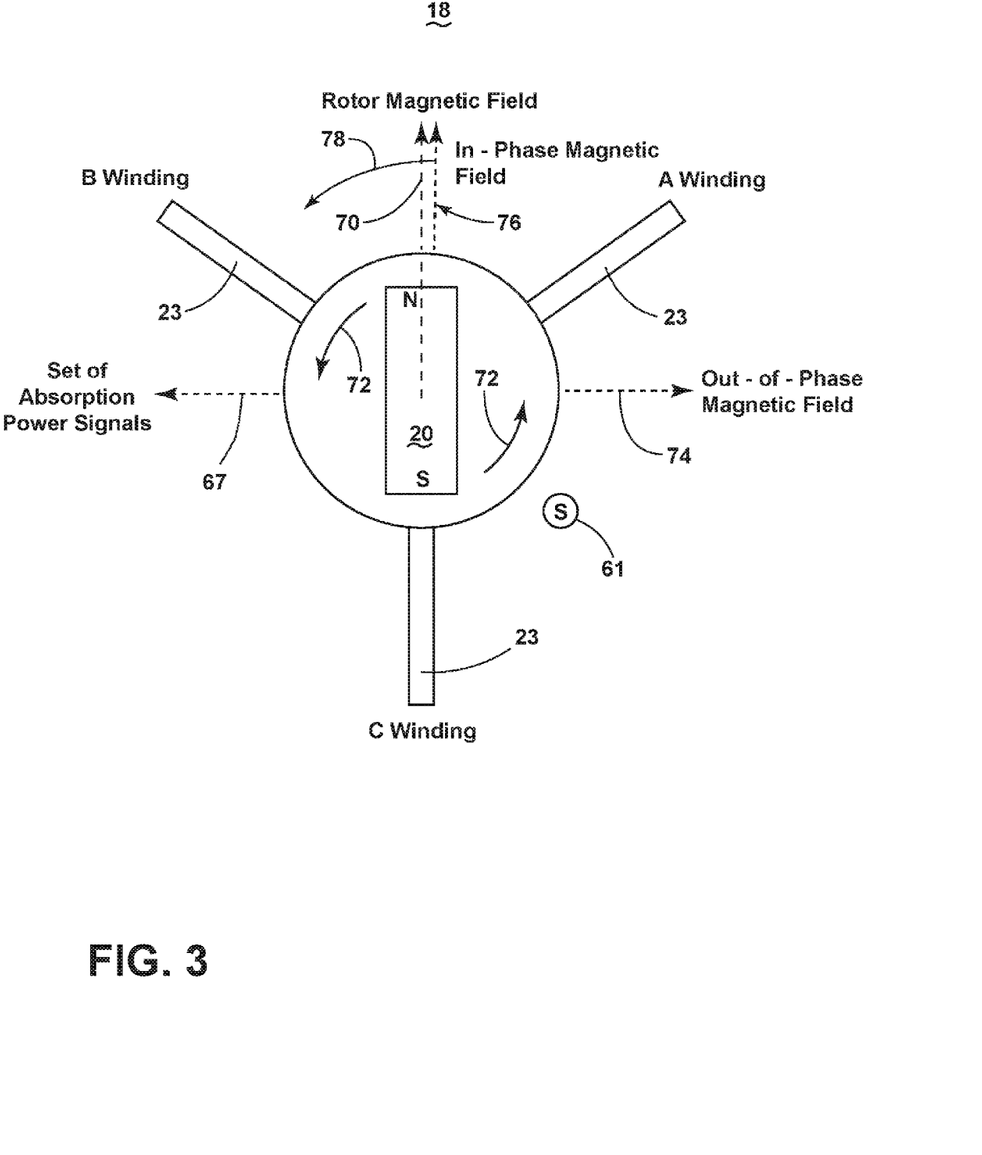
FIG. 3 is a schematic view of the main machine rotor and stator of FIGS. 1 and 2, in accordance with various aspects described herein.

FIG. 3 illustrates a schematic view of the second machine 18, that is, the main machine rotor 20 and main machine stator 22. The illustration demonstrates one non-limiting example of the converting of an out-of-phase magnetic field of the stator windings 23 to an in-phase magnetic field, for understanding. As illustrated, the main machine rotor 20 defines at least one pole (e.g. north and south indicators) defining a rotor magnetic field, illustrated by a first dotted arrow 70. The rotor magnetic field 70 co-rotates with the rotation of the main machine rotor 20 (the rotation illustrated by arrows 72) at a known or predetermined angular rate, as driven by the rotatable shaft 32 or driving force (e.g. the mechanical shaft 38). The rotor magnetic field 70 can also be referred to as the "direct axis" or "d-axis." Additionally, the rotational position of the main machine rotor 20 can be sensed or measured by the optional rotatable shaft sensor 61, or by estimation, including but not limited to, sensorless electrical angle estimation techniques.

The illustration also includes a set of main machine stator windings 23, illustrated as "A Winding," "B Winding," and "C Winding." While a three phase set of stator windings 23 have been illustrated for understanding, embodiments of the disclosure can be applied to electric machine assemblies 10 having any number of stator windings or stator winding phases. Additionally, while the rotor 20 is illustrated having a single pole for understanding, embodiments of the disclosure can be applied to rotors 20 having any number of rotor poles or rotor windings.

In embodiments wherein the power converter unit 50 or power converter 62 do not adjust, modify, or sync the absorption power signals provided to the set of stator windings 23 during the power absorption mode, the magnetic field generated by the set of stator windings 23 (illustrated by a second dotted arrow 74) can be out-of-phase or out-of-sync with the rotating magnetic field of the rotor 70. The interaction of the out-of-phase magnetic field 74 with the rotating rotor magnetic field 70 will result in torque experience by the rotating rotor 20 or rotatable shaft 32, as explained above.

Thus, embodiment of the disclosure can include altering, modifying, or changing the absorption power signals by way of the power converter unit 50, the power converter 62, as controllably operated by the control module 63 or the processor 64, to sync phases with, or match the rotating magnetic field of the rotor 70. The altering, modifying, or changing the absorption power signals can be based on at least one of the sensed or measured rotational position of the main machine rotor 20 or by estimation of the rotational position of the main machine rotor 20, as explained herein. An example in-phase magnetic field generated by the absorption power signals traversing the set of main machine stator windings 23 is illustrated by dotted line 76, and co-rotates with rotation of the main machine rotor 20 or the rotation of the rotor magnetic field 70 (as shown by rotation arrow 78).

Figure 4:
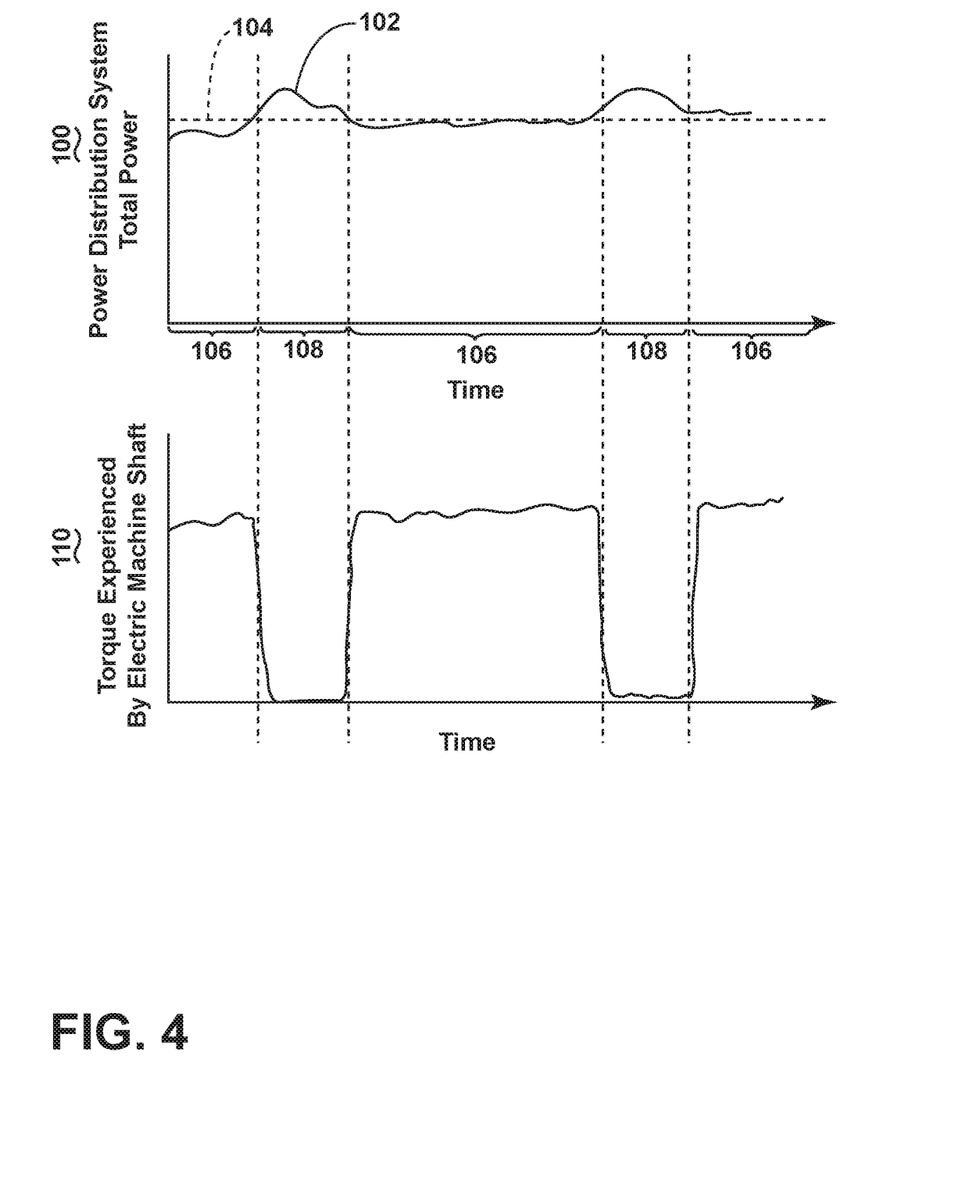
FIG. 4 is a series of plot graphs showing operation of the power converter unit of FIG. 2, in accordance with various aspects described herein.

FIG. 4 illustrates a series of plot graphs showing the torque experienced by the main machine rotor 20, the rotatable shaft 32, or by the electric machine assembly 10 during the power generation mode and the power absorption mode. As illustrated, a first plot 100 illustrates the total power 102 or total power levels of the power distribution network 54 over a period of time, relative to an example power level threshold value 104 or range, for example, as measured by the power sensor 68. Also illustrated, a second plot 110 illustrates an amount of torque experienced by the main machine rotor 20, the rotatable shaft 32, or by the electric machine assembly 10, as time-aligned with the first plot 100.

As shown, when the total power 102 does not exceed, or is equal to or less than the power level threshold value 104, the electric machine assembly 10 operates in the power generation mode 106, wherein the generator provides power to the power distribution network 54, and an amount of torque is experienced by the rotatable shaft 32, as shown in the second plot 110.

When the total power 102 exceeds or is greater than the power level threshold value 104, the electric machine assembly 10 operates in the power absorption mode 108, wherein the power converter unit 50 converts power received by the power distribution network 54 to match or be in-phase with the rotating rotor magnetic field 70. During the power absorption mode 108, the torque experienced by the rotatable shaft 32, as shown in the second plot 110, is reduced or drops substantially to zero, and can include experiencing no torque (i.e. zero torque).

Once the total power 102 falls below, or does not exceed the power level threshold value 104, the electric machine assembly 10, again, operates in the power generation mode 106. The electric machine assembly 10 can switch, toggle, or actuate between the power generation mode 106 and the power absorption mode 108, as needed.

Figure 5:
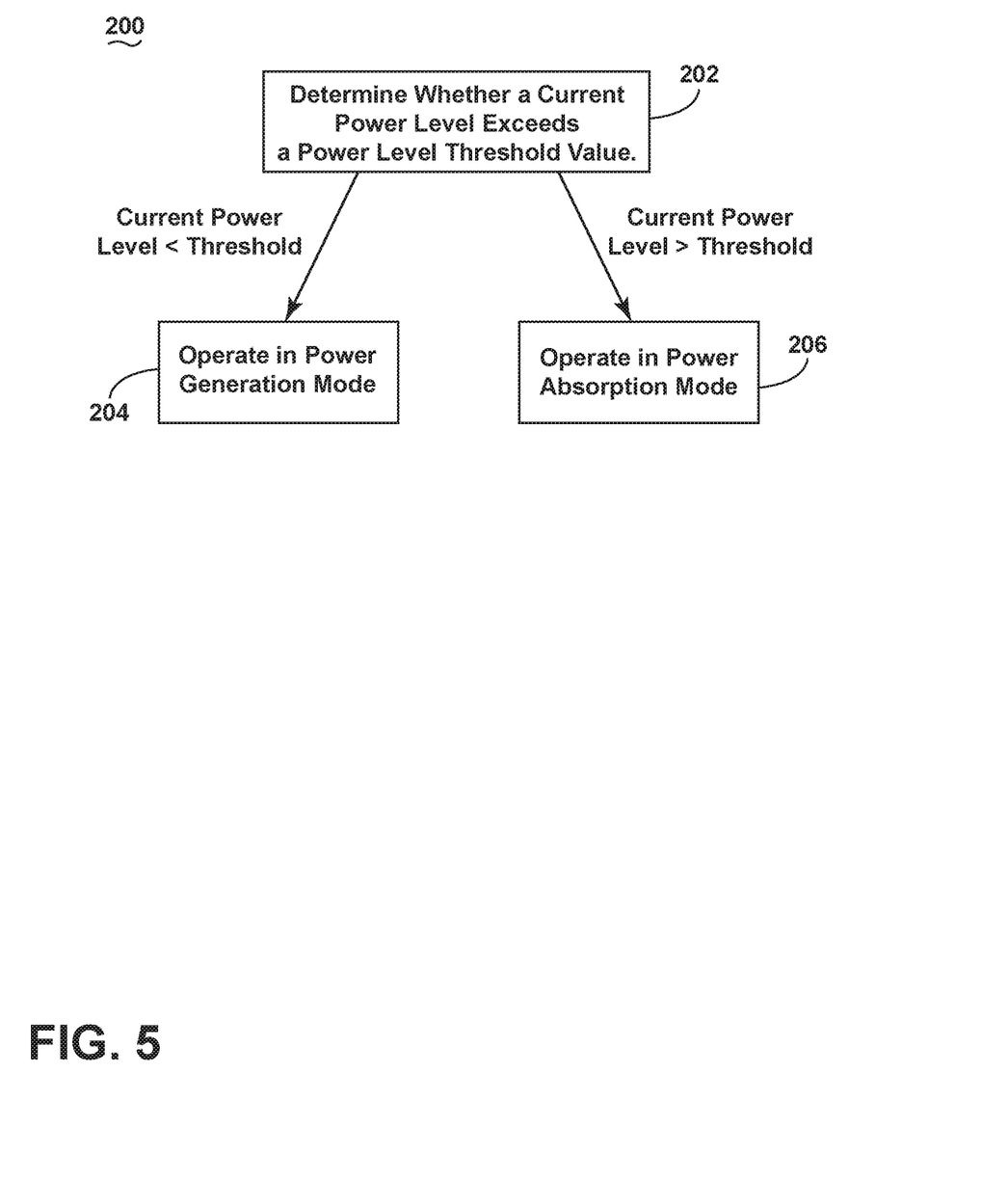
FIG. 5 is an example a flow chart diagram of demonstrating a method of operating the generator, in accordance with various aspects described herein.

FIG. 5 illustrates a flow chart demonstrating a method 200 of operating the electric machine assembly 10. The method begins by determining, in the control module 63, whether the current power level for the power distribution network 54 coupled with the second input/output connection 56 exceeds the power level threshold value 104 at 202. As used above, "the current power level" denotes "current" as in temporally relevant, accurate, or recent; not "current" as used in electrical or power terms (e.g. amperage). In response to determining the current power level does not exceed the power level threshold value 104, the control module 63 can selectively operate the electric machine assembly 10 in the power generation mode 106, whereby the rotation of a rotor 20 relative to a set of stator windings 23 supplies power from the electric machine 10 to the power distribution network 54, at 204.

In response to determining the current power level exceeds the power level threshold value 104, the control module 63 can selectively operate the electric machine assembly 10 in the power absorption mode 206, whereby power in the power distribution network 54 is received by a power converter unit 50 or power converter 62, the power is converted by the power converter unit 50 or power converter 62 to a power signal corresponding with the rotating magnetic field 70 of a rotating rotor 20, and the power signal is supplied from the power converter unit 50 or power converter 62 to a set of stator windings 23, whereby the interaction of the power signal in the stator windings 23 is in-phase with the magnetic field 70 of the rotating rotor 20 and reduces or eliminates torque experienced by the rotating rotor 20.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method.

Many other possible embodiments and configurations in addition to that shown in the above figures are contemplated by the present disclosure. For example, one embodiment of the invention contemplates the electric machine assembly is also a starter/generator and wherein the power converter unit can be further configured to operate a power converting process for starting the starter/generator or the gas turbine engine. In another non-limiting example embodiment of the disclosure, the electric machine assembly can include a set of windings arranged to generate more or fewer phases of power at the main machine output than illustrated. For example, the generator can generate a single phase of power, two phases of power, six phases of power, etc. In such embodiments of the disclosure, the power converter unit can be configured to account for, or to match the number of generated power phases.

The method and apparatus disclosed herein provides for an electric machine assembly configured to operate in a power generating mode or a power absorbing mode. The technical effect is that the above described embodiments enable the operation of a generator that can both generate power for a power distribution network and absorb excess power form the power distribution network without affecting the rotation of the rotatable shaft of the generator. One advantage that can be realized in the above disclosure is that the method and apparatus enables excess power absorption from the power distribution network without causing or effecting a change in torque on the rotatable shaft. By reducing or preventing a change in torque, the method and apparatus reduce or prevent undesirable interruptions or rotational forces from damaging the generator or any other rotatable components rotationally coupled with the generator shaft. Another advantage of the above-described embodiments is that the existing cooling systems for dissipating heat in the stator windings can be utilized to dissipate the heating of the windings during the power absorption mode. Thus, existing generators may not require retrofitting or reconfiguring to incorporate embodiments of the disclosure.

Yet another advantage of the above described embodiments is that existing regeneration or excess power storage components can be reduced or eliminated in the power distribution network. The existing components can include batteries, which have a limited charge/discharge life span, and can introduce undesirable chemical, weight, or safety concerns for the power distribution network.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine assembly comprising:
   a rotatable shaft configured to operably couple with a source of rotational force;
   a rotor mounted to the rotatable shaft and having at least one rotor pole defining a rotatable direct axis;
   a stator about the rotor and having a set of stator windings; and
   a power converter unit electrically coupled with the set of stator windings and operable in a power generating mode and a power absorption mode;
   wherein the power converter unit in the power generating mode is configured to convert power generated in the set of stator windings to supply to a power distribution network; and
   wherein the power converter unit in the power absorption mode is configured to convert excess power from the power distribution network to a set of absorption power signals in-phase with the rotatable direct axis, and to supply the set of absorption power signals to the set of stator windings and reduces torque experienced by the electric machine when supplied to the set of stator windings in the electric machine.

2. The electric machine assembly of claim 1, wherein the power converter unit further comprises at least one of a power converter or current regulator.

3. The electric machine assembly of claim 2, wherein the at least one of a power converter or current regulator comprises a transistor bridge selectively operable to convert a first power to a second power.

4. The electric machine assembly of claim 3, further comprising a sensor configured to determine a rotatable position of the rotatable shaft.

5. The electric machine assembly of claim 4, wherein the at least one of a power converter or current regulator is configured to respectively convert or regulate excess power of the power distribution network to the set of absorption power signals based on a position of the rotatable shaft.

6. The electric machine assembly of claim 1, further comprising a sensor configured to determine current power characteristics of the power distribution network.

7. The electric machine assembly of claim 1, further comprising a stator winding heat dissipation system.

8. A power converter unit for an electric machine comprising:
   a first input/output connection configured to operably couple with a set of stator windings of an electric machine;
   a second input/output connection configured to operably couple with a power distribution network; and
   a power-converting circuit operable in a power supplying mode or in a power dissipating mode;
   wherein the power-converting circuit in the power supplying mode is configured to convert a first power received at the first input/output connection from the electric machine to a desired power supply for the power distribution network and to supply the converted first power to the second input/output connection;
   wherein the power-converting circuit in the power dissipating mode is configured to convert a second power in excess of desired power characteristics received at the second input/output connection from the power distribution network to a converted second power and to supply the converted second power to the first input/output connection; and
   wherein the converted second power is in phase with a rotatable direct axis of the electric machine and reduces torque experienced by the electric machine when supplied to a set of stator windings in the electric machine.

9. The power converter unit of claim 8, further comprising a controller module communicatively coupled with the power converting circuit and configured to operate the power converting circuit in the power supplying mode or the power dissipating mode.

10. The power converter unit of claim 9, wherein the power converter unit comprises at least one of an active-rectifier power converter or a transistor bridge, and wherein the controller module is communicatively coupled with the at least one of an active-rectifier power converter or a transistor bridge.

11. The power converter unit of claim 8, further comprising a sensor configured to determine current power characteristics of the power distribution network.

12. A method of operating an electric machine, comprising:
    determining, in a control module, whether a current power level for a power distribution system coupled with an input/output of the electric machine exceeds a power level threshold value:
    in response to the current power level not exceeding the power level threshold value, operating the electric machine in a power generation mode wherein rotation of a rotor relative to a set of stator windings of the electric machine supplies power from the electric machine to the power distribution system; and
    in response to the current power level exceeding the power level threshold value, operating the electric machine in a power absorption mode wherein power in the power distribution system is received by a power converter, converted by the power converter to a set of absorption power signals in-phase with a rotating magnetic field of a rotating rotor in the electric machine, and wherein the set of absorption power signals is supplied from the power converter to the set of stator windings of the electric machine,
    whereby to dissipate heat in the set of stator windings such that torque experienced by the rotating rotor is reduced.

13. The method of claim 12, wherein the operating the electric machine in the power absorption mode comprises eliminating excess torque experienced by the rotating rotor.

14. The method of claim 12, further comprising sensing, by a power sensor, the current power level for the power distribution system.

15. The method of claim 12, further comprising sensing, by a sensor, a position of the rotating rotor.

16. The method of claim 15, wherein the set of absorption power signals is based on the position of the rotating rotor.

17. The method of claim 16, wherein the set of absorption power signals is configured to generate a rotating magnetic field in the set of stator windings in-phase with a magnetic field of the rotating rotor.

18. The method of claim 12, wherein the operating the electric machine in the power absorption mode comprises controllably dissipating at least a portion of the set of absorption power signals, as heat, in the set of stator windings.

19. The method of claim 12, further comprising estimating, by the control module, a position of the rotating rotor.

20. The method of claim 19, wherein the set of absorption power signals is based on the rotating rotor position.

* * * * *